(12) United States Patent
Itoh

(10) Patent No.: US 9,134,417 B2
(45) Date of Patent: Sep. 15, 2015

(54) OBSTACLE DETERMINATION DEVICE

(71) Applicants: TOYOTA JIDOSHA KABUSHIKI KAISHA, Toyota-shi, Aichi (JP); FUJITSU TEN LIMITED, Kobe-shi, Hyogo (JP)

(72) Inventor: Jun Itoh, Kobe (JP)

(73) Assignees: TOYOTA JIDOSHA KABUSHIKI KAISHA, Aichi (JP); FUJITSU TEN LIMITED, Hyogo (JP)

( * ) Notice: Subject to any disclaimer, the term of this patent is extended or adjusted under 35 U.S.C. 154(b) by 0 days.

(21) Appl. No.: 14/378,567

(22) PCT Filed: Nov. 14, 2012

(86) PCT No.: PCT/JP2012/079538
§ 371 (c)(1),
(2) Date: Aug. 13, 2014

(87) PCT Pub. No.: WO2013/125110
PCT Pub. Date: Aug. 29, 2013

(65) Prior Publication Data
US 2015/0032363 A1    Jan. 29, 2015

(30) Foreign Application Priority Data

Feb. 20, 2012  (JP) ................. 2012-034360

(51) Int. Cl.
*G01S 13/93* (2006.01)
*G08G 1/16* (2006.01)
*B60T 7/22* (2006.01)
*G01S 13/46* (2006.01)

(52) U.S. Cl.
CPC ............. *G01S 13/931* (2013.01); *B60T 7/22* (2013.01); *G08G 1/165* (2013.01); *G01S 2013/462* (2013.01); *G01S 2013/9375* (2013.01)

(58) Field of Classification Search
CPC ............ G01S 13/931; G01S 2013/462; G01S 2013/9375; B60T 7/22; G08G 1/165
USPC ........................................................ 701/301
See application file for complete search history.

(56) References Cited

U.S. PATENT DOCUMENTS

2013/0002470 A1*  1/2013  Kambe et al. ................... 342/55

FOREIGN PATENT DOCUMENTS

JP   2010-287015 A   12/2010
JP   2011-133946 A    7/2011

* cited by examiner

*Primary Examiner* — Mary Cheung
*Assistant Examiner* — Anne Mazzara
(74) *Attorney, Agent, or Firm* — Sughrue Mion, PLLC

(57) ABSTRACT

Disclosed is an obstacle determination device (1) including a driving assistance ECU (3) that determines collision with an obstacle detected by output of a radar (2) mounted on a vehicle and performs driving assistance for the vehicle. When a distance of a null-point zone divided by null points where the output of the radar (2) is low is represented as a distance between the null points, the driving assistance ECU (3) determines, in a distant zone that is away from a reference zone that is the null-point zone nearest to a host vehicle in a predetermined range, if the null-point zone of the distance between the null points shorter than the distance between the null points in the reference zone is detected by a predetermined number or more, that the host vehicle does not collide with the detected obstacle.

7 Claims, 13 Drawing Sheets

(a)

(b)

OBSTACLE DETERMINATION DEVICE

CROSS REFERENCE TO RELATED APPLICATIONS

This application is a National Stage of International Application No. PCT/JP2012/079538 filed Nov. 14, 2012, claiming priority based on Japanese Patent Application No. 2012-034360 filed Feb. 20, 2012, the contents of all of which are incorporated herein by reference in their entirety.

TECHNICAL FIELD

The present invention relates to an obstacle determination device that determines collision with an obstacle detected from output of a radar mounted on a vehicle.

BACKGROUND ART

In the related art, a device that detects an obstacle present in front of a vehicle from output of a radar mounted on the vehicle and predicts collision between the detected obstacle and the host vehicle is known. However, when the vehicle travels on a descending slope, a subjacent object present on a front side of the descending slope is detected as an obstacle, similar to a collision target on a flat road. Here, the subjacent object refers to an iron plate, an iron rail or the like provided on a road surface, which is an obstacle with no likelihood of collision with the host vehicle. Further, the collision target refers to a stopped vehicle or the like on a road, which is an obstacle with a likelihood of collision with the host vehicle.

In this regard, Patent Literature 1 discloses a collision prediction device that is provided with slope determination means for determining whether a host vehicle is traveling on a slope. Here, if the slope determination means determines that the host vehicle is traveling on the slope, the collision prediction device reduces collision determination sensitivity.

CITATION LIST

Patent Literature

[Patent Literature 1] Japanese Unexamined Patent Application Publication No. 2011-133946

SUMMARY OF INVENTION

Technical Problem

However, the collision prediction device disclosed in Patent Literature 1 should be provided with the slope determination means and should determine whether the vehicle is traveling on the slope in the collision determination. For this reason, in the collision prediction device disclosed in Patent Literature 1, there is a problem in that a load for control of the collision determination increases.

An object of the invention is to provide an obstacle determination device capable of suppressing a load increase in control of collision determination and improving accuracy of the collision determination.

Solution to Problem

The present inventors extensively reviewed the above problem, and consequently reached the following understanding. Detection of an obstacle in front of a vehicle is performed by detecting a reflected wave from the obstacle by a radar. However, since the reflected wave from the obstacle is affected by multipath, a null point where a reception intensity of the reflected wave is low and a convex point where the reception intensity of the reflected wave is high are generated in an output waveform of the radar. Further, if the detected obstacle is a collision target on a flat road, the distance between the null points, which is the distance of a null-point zone divided by the null points is reduced as the vehicle approaches the obstacle. On the other hand, if the detected obstacle is a subjacent object on a front side of a descending slope, the distance between the null points becomes irregular regardless of the distance to the obstacle. Thus, it is not possible to determine whether the detected obstacle is the collision target on the flat road or the subjacent object on the front side of the descending slope by calculating the distance between the null points from the output of the radar represented by the reception intensity of the reflected wave in the radar.

Hence, according to an aspect of the invention, there is provided an obstacle determination device that determines collision with an obstacle detected by output of a radar mounted on a vehicle, in which when a distance of a null-point zone divided by null points where the output of the radar is low is represented as a distance between the null points, if in a distant zone that is away from a reference zone that is the null-point zone nearest to a host vehicle in a predetermined range, the null-point zone of the distance between the null points shorter than the distance between the null points in the reference zone is detected by a predetermined number or more, it is determined that the host vehicle does not collide with the obstacle.

In the obstacle determination device according to this aspect of the invention, since the collision determination is performed based on the relationship between the distance between the null points in the reference zone and the distance between the null points in the distant zone that is away from the reference zone, it is possible to prevent a subjacent object on a front side of a descending slope from being mistakenly determined as an obstacle with a likelihood of collision with the vehicle. In addition, by performing the collision determination of the obstacle in this manner, it is possible to perform collision determination on a slope with high accuracy only with the output of the radar, and it is thus possible to suppress a load increase in control of the collision determination.

In this case, it is preferable that the null point be a point where the output of the radar is low due to multipath. In this manner, since the null point is not a point where the output of the radar is low due to the influence of noise but is the point where the output of the radar is low due to the multipath, it is possible to enhance the accuracy of the collision determination.

Further, the null-point zone may be a zone that includes a convex point where the output of the radar is high. With this configuration, it is possible to appropriately set the null-point zone.

In this case, it is preferable that the convex point be a point where the output of the radar is high due to multipath. In this manner, since the convex point is not a point where the output of the radar is high due to the influence of noise but is the point where the output of the radar is high due to the multipath, it is possible to enhance the accuracy of the collision determination.

Further, the predetermined range may be a range where the radar is capable of stably detecting the obstacle. With this configuration, it is possible to appropriately perform the collision determination.

Further, in this aspect of the invention, even though the null-point zone of the distance between the null points shorter than the distance between the null points in the reference zone is detected by the predetermined number or more, if the output of the radar exceeds a threshold value, it may be determined that the host vehicle collides with the obstacle. Since the influence of the multipath depends on a surrounding environment, if the collision determination of the obstacle is performed based on only the distance between the null points, there is a possibility of mistaken determination. On the other hand, the reception intensity of the reflected wave in the radar is high in a case where the obstacle is a subjacent object, compared with a case where the obstacle is a collision target. Thus, if the output of the radar exceeds the threshold value regardless of the distance between the null points, it is determined that the host vehicle collides with the obstacle, and thus, it is possible to enhance the accuracy of the collision determination.

In this case, it is preferable that the threshold value become high as the host vehicle approaches the obstacle. The reception intensity of the reflected wave in the radar becomes high as the host vehicle approaches the obstacle. Thus, by setting the threshold value in this manner, it is possible to enhance the accuracy of the collision determination.

Advantageous Effects of Invention

According to the invention, it is possible to enhance the accuracy of collision determination while suppressing a load increase in control of the collision determination.

DESCRIPTION OF EMBODIMENTS

Figure 1:
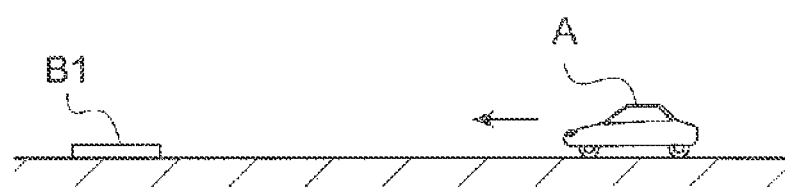
FIG. 1 is a diagram illustrating a case where an obstacle is a subjacent object (an iron plate) on a flat road, in which (a) is a diagram illustrating a positional relationship between a host vehicle and the subjacent object, and (b) is a diagram illustrating an output waveform of a radar.
Figure 1:
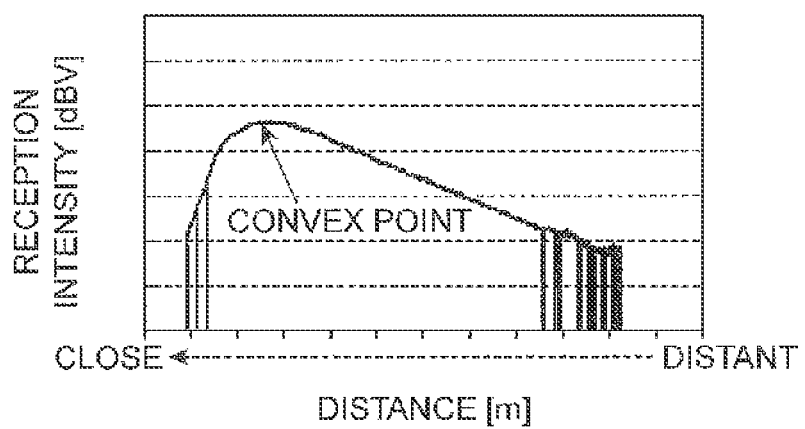

Hereinafter, embodiments of an obstacle determination device according to the invention will be described with reference to the accompanying drawings. The same reference numerals are given to the same or corresponding components in the respective drawings, and the description will not be repeated.

First, before specifically describing the obstacle determination device according to the present embodiment, an outline of collision determination in the present embodiment will be described with reference to FIG. 5.

Figure 2:
FIG. 2 is a diagram illustrating a case where an obstacle is a collision target (a stopped vehicle) on a flat road, in which (a) is a diagram illustrating a positional relationship between a host vehicle and the collision target, and (b) is a diagram illustrating an output waveform of a radar.
Figure 2:
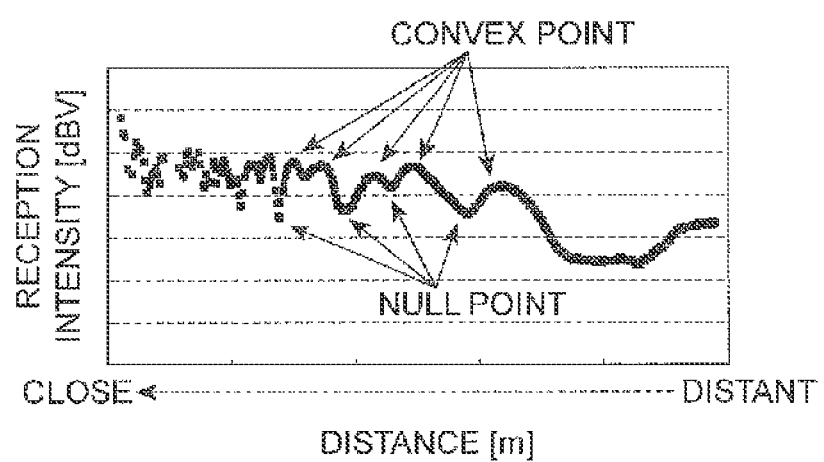
Figure 3:
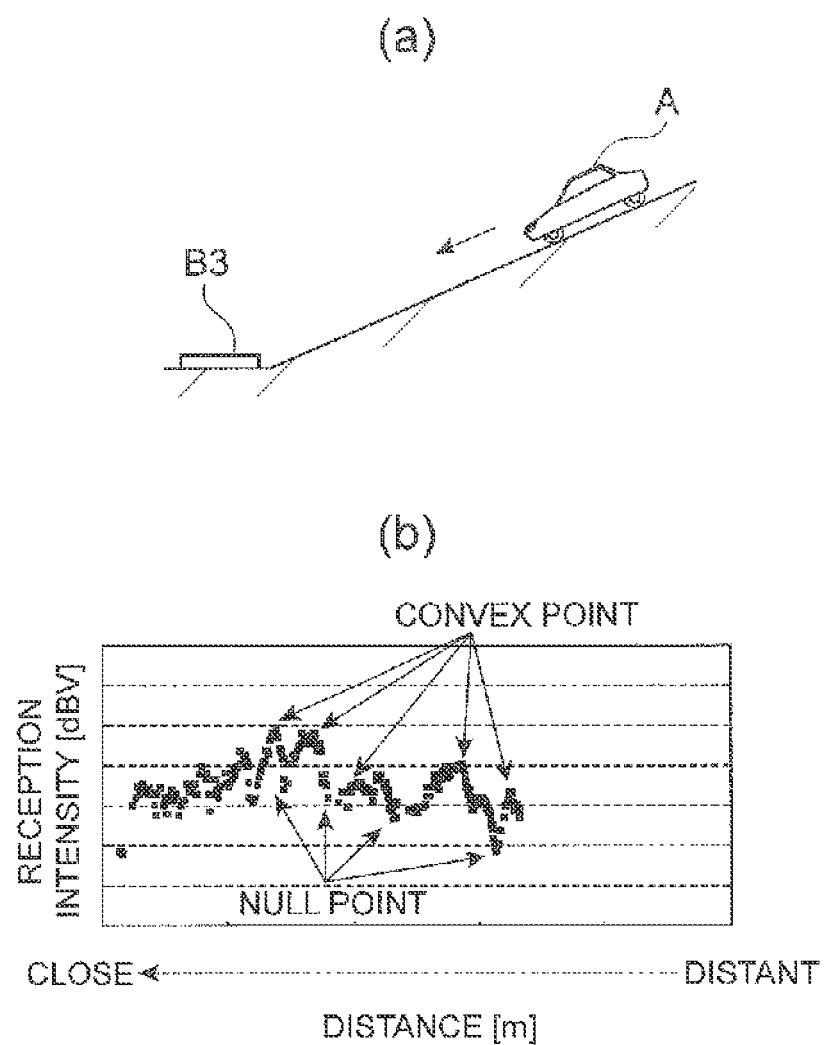
FIG. 3 is a diagram illustrating a case where an obstacle is a subjacent object (an iron plate) on a front side of a descending slope, in which (a) is a diagram illustrating a positional relationship between a host vehicle and the subjacent object, and (b) is a diagram illustrating an output waveform of a radar.
Figure 4:
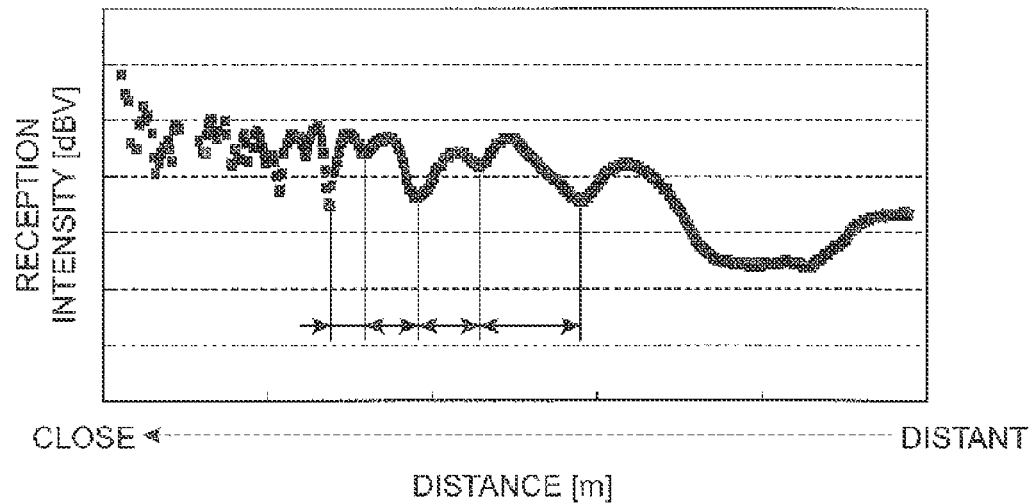
FIG. 4 is a diagram illustrating positions of null points in the output waveform of the radar shown in (b) of FIG. 2.

FIG. 1 is a diagram illustrating a case where an obstacle is a subjacent object (an iron plate) on a flat road, in which (a) is a diagram illustrating a positional relationship between a host vehicle and the subjacent object, and (b) is a diagram illustrating an output waveform of a radar. FIG. 2 is a diagram illustrating a case where an obstacle is a collision target (a stopped vehicle) on a flat road, in which (a) is a diagram illustrating a positional relationship between a host vehicle and the collision target, and FIG. 2(b) is a diagram illustrating an output waveform of a radar. FIG. 3 is a diagram illustrating a case where an obstacle is a subjacent object (an iron plate) on a front side of a descending slope, in which (a) is a diagram illustrating a positional relationship between a host vehicle and the subjacent object, and (b) is a diagram illustrating an output waveform of a radar. FIG. 4 is a diagram illustrating positions of null points in the output waveform of the radar shown in (b) of FIG. 2. FIG. 5 is a diagram illustrating positions of null points in the output waveform of the radar shown in (b) of FIG. 3. In FIGS. 1 to 3, reference sign A represents the host vehicle, reference sign B1 represents the subjacent object on the flat road, reference sign B2 represents the collision target on the flat road, and reference sign B3 represents the subjacent object on the front side of the descending slope. As described above, the collision target refers to a stopped vehicle or the like on a road, which is an obstacle with a likelihood of collision with a host vehicle. Further, the subjacent object refers to an iron plate, an iron rail or the like provided on a road surface, which is an obstacle with no likelihood of collision with the host vehicle.

As shown in FIG. 1, when the obstacle is the subjacent object B1 on the flat road, the output waveform of the radar becomes a waveform that becomes high to depict a mountain as the host vehicle approaches the obstacle. Thus, the number of peaks where a reception intensity of a reflected wave from the subjacent object is high is only one.

As shown in FIG. 2, when the obstacle is the collision target B2 on the flat road, the output waveform of the radar becomes a waveform that includes plural convex points and plural null points. Here, the null point refers to a peak where the reception intensity of the reflected wave is low due to the influence of multipath. The convex point refers to a peak where the reception intensity of the reflected wave is high due to the influence of multipath, in contrast with the null point.

Thus, when the host vehicle travels on the flat road, it is possible to determine that the obstacle is the subjacent object on the flat road or the collision target on the flat road by detecting the number of the convex points and the null points from the output waveform of the radar. That is, when only one convex point is detected from the output waveform of the radar, it is possible to determine that the obstacle is the subjacent object on the flat road, and when the plural convex points and the plural null points are detected from the output waveform of the radar, it is possible to determine that the obstacle is the collision target on the flat road.

However, as shown in FIG. 3, when the obstacle is the subjacent object B3 on the front side of the descending slope, the output waveform of the radar becomes a waveform that includes plural convex points and plural null points, similar to the case where the obstacle is the collision target on the flat road (see FIG. 2).

Thus, it is not possible to determine whether the obstacle is the collision target on the flat road or the subjacent object on the front side of the descending slope only with the detection of the number of the convex points and the null points from the output waveform of the radar.

Figure 5:
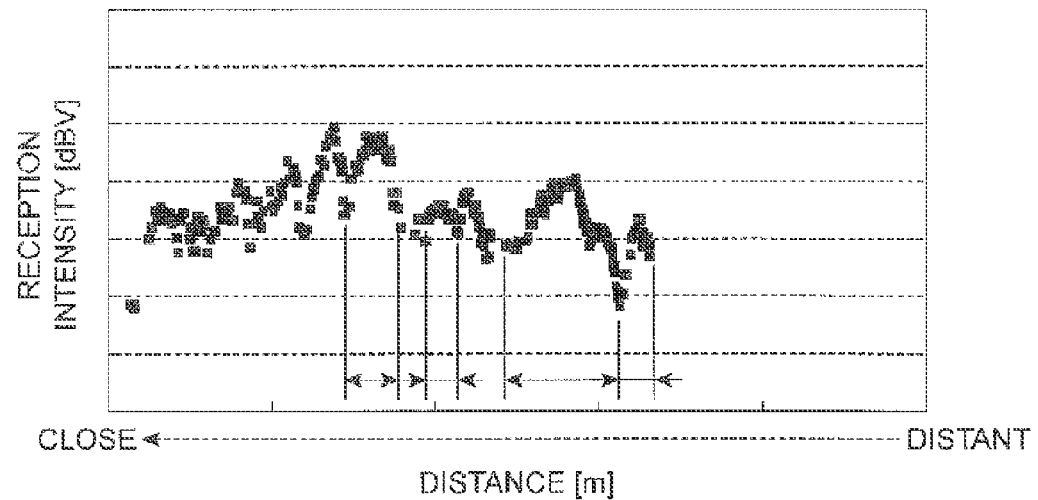
FIG. 5 is a diagram illustrating positions of null points in the output waveform of the radar shown in (b) of FIG. 3.

In the present embodiment, as shown in FIGS. 4 and 5, attention is paid to intervals of the null points and the convex points represented due to the influence of the multipath. That is, as shown in FIG. 4, when the obstacle is the collision target on the flat road, as the host vehicle approaches the obstacle (as the host vehicle moves toward the obstacle), the distance between the null points that is the distance (movement distance) of a null-point zone divided by the null points is shortened. On the other hand, as shown in FIG. 5, in a case where the obstacle is the subjacent object on the front side of the descending slope, the distance between the null points becomes irregular regardless of the distance to the obstacle.

Thus, in the present embodiment, by detecting the null-point zone from the output waveform of the radar represented as the reception intensity of the radar and checking a relational characteristic of the distance between the null points in the detected null-point zone, it is possible to determine whether the obstacle is the collision target on the flat road or the subjacent object on the front side of the descending slope. That is, in the present embodiment, the distance between the null points nearest to the host vehicle in a predetermined range is set as a reference zone. Further, if the distance between the null points less than the distance between the null points in the reference zone is detected in a distant zone that is away from the reference zone, it is determined that the detected obstacle is the subjacent object on the front side of the descending slope. On the other hand, if the distance between the null points less than the distance between the null points in the reference zone is detected in the distant zone that is away from the reference zone, it is determined that the detected obstacle is the collision target on the flat road.

First Embodiment

Next, an obstacle determination device according to the first embodiment will be described in detail.

Figure 6:
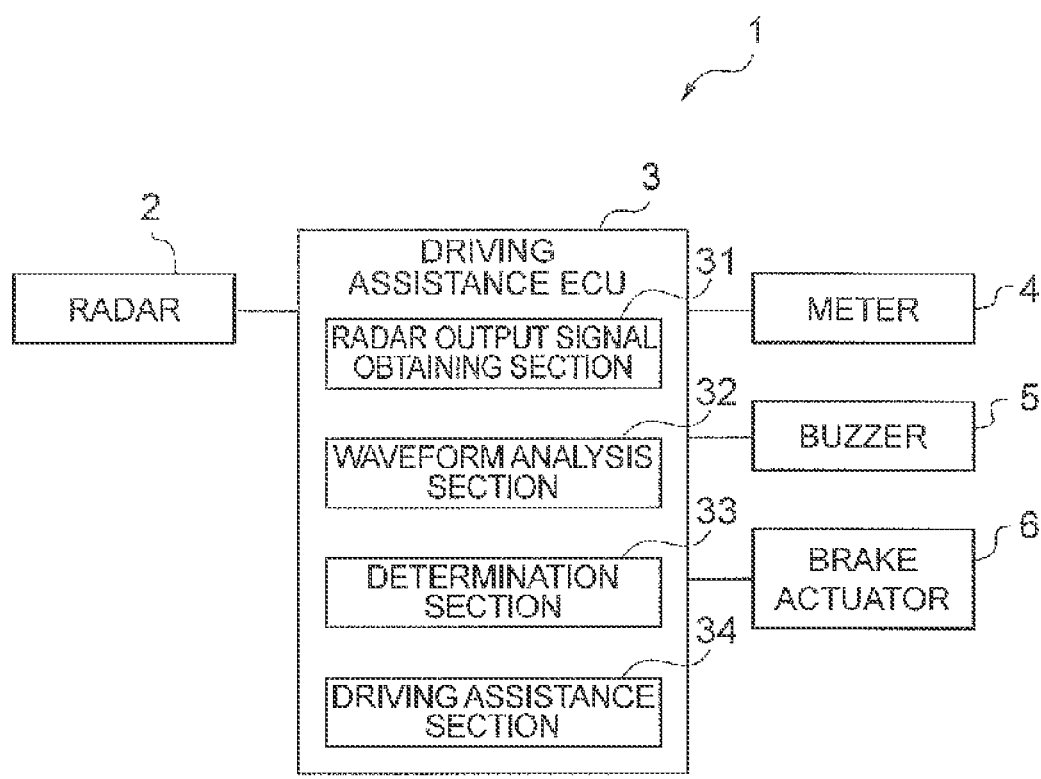
FIG. 6 is a diagram illustrating a block configuration of an obstacle determination device according to an embodiment.

FIG. 6 is a diagram illustrating a block configuration of an obstacle determination device according to an embodiment. As shown in FIG. 6, an obstacle determination device 1 according to the present embodiment is mounted on a vehicle, and includes a radar 2, a driving assistance electronic control unit (ECU) 3, a meter 4, a buzzer 5 and a brake actuator 6.

The radar 2 is a radar such as a millimeter wave radar mounted in a front head part of the vehicle (vehicle front part). The radar 2 transmits an electromagnetic wave such as a millimeter wave to the vehicle front part and receives a reflected wave, to detect an obstacle in front of the vehicle and to detect the position of the obstacle. If the reflected wave is received from the obstacle, the radar 2 transmits the reception intensity of the reflected wave to a driving assistance ECU 3 as an output signal.

The driving assistance ECU3 detects the obstacle in front of the vehicle based on the output signal of the radar 2, and determines whether the detected obstacle is an obstacle with a likelihood of collision with the host vehicle or an obstacle with no likelihood of collision with the host vehicle. Further, the driving assistance ECU3 controls the meter 4, the buzzer 5, the brake actuator 6 and the like based on the determination result, to perform driving assistance for the vehicle. To this end, the driving assistance ECU3 includes functions of a radar output signal obtaining section 31, a waveform analysis section 32, a determination section 33 and a driving assistance section 34.

The radar output signal obtaining section 31 obtains the output signal of the radar 2. The output signal of the radar 2 obtained by the radar output signal obtaining section 31 has an output waveform as shown in FIGS. 1 to 3, for example.

The waveform analysis section 32 analyzes the output waveform of the radar 2 obtained by the radar output signal obtaining section 31 to detect a detection points, a convex point, a null point and an extrapolation point. Here, the detection point refers to a point where the radar 2 receives a reflected wave from a specific obstacle for the first time. Thus, the detection of the obstacle in front of the vehicle is performed by detecting the detection point from the output waveform of the radar 2. Here, the detection of the obstacle in front of the vehicle is not particularly limited, and may be performed by a different method. Further, the extrapolation point refers to a point where the reflected wave from the obstacle cannot be received due to the influence of a surrounding environment or the like after the obstacle is detected. Here, since the reflected wave cannot be received often, only when a point where the reflected wave cannot be received continues over a predetermined distance or more, the point is detected as the extrapolation point. That is, when the point where the reflected wave cannot be continuously received does not continue over the predetermined distance or more, the point is ignored without being detected as the extrapolation point.

Here, as described above, the convex point refers to a peak where the reception intensity of the reflected wave is high due to the influence of the multipath, and the null point refers to a peak where the reception intensity of the reflected wave is low due to the influence of the multipath. However, the peak where the reception intensity of the reflected wave is high or the peak where the reception intensity of the reflected wave is low is represented due to other various influences such as noise. Thus, if all the peaks are detected as the convex points and the null points, the accuracy of collision determination is decreased.

Thus, the waveform analysis section 32 excludes the peaks represented in the output waveform of the radar 2 due to the other various influences such as noise from the convex points and the null points, and detects only the peaks represented in the output waveform of the radar 2 due to the influence of the multipath as the convex points and the null points. The detection of the peaks represented in the output waveform of the radar 2 due to the influence of the multipath may be performed by various methods. For example, among the peaks where the reception intensity of the reflected wave is high, a peak where a difference in the reception intensity with respect to the detection point or the null point is equal to or greater than a predetermined setting value for the detection points or the null points and a movement distance from the detection point or the null point is equal to or greater than a predetermined setting value may be determined as a convex point represented due to the influence of the multipath. Further, among the peaks where the reception intensity of the reflected wave is low, a peak where a difference in the reception intensity with respect to the detection point or the null point is equal to or greater than a predetermined setting value for the detection points or the null points and a movement distance from the detection point or the null point is equal to or greater than a predetermined setting value may be determined as a null point represented due to the influence of the multipath. In these cases, the setting value of the difference in the reception intensity and the setting value of the movement distance may be arbitrarily set. For example, the setting value of the difference in the reception intensity may be set to about 5 dB, and the setting value of the movement distance may be set to about 4 m. The detection of the convex point and the null point represented due to the influence of the multipath is not limited to the above-described method, but may be performed by other various methods.

The determination section 33 determines the likelihood of collision with the detected obstacle based on the distance between the null points calculated from the output waveform of the radar 2 obtained by the radar output signal obtaining section 31, and has a function for determining a subjacent object during traveling on the slope.

The subjacent object determination refers to determination on whether the obstacle detected from the output waveform of the radar 2 is one of the collision target on the flat road and the subjacent object on the front side of the descending slope based on the relational characteristic of the distance between the null points. Hereinafter, the subjacent object determination will be described in detail.

In the subjacent object determination, first, a movement zone that is a target of the null-point zone is set from the output waveform of the radar 2 obtained by the radar output signal obtaining section 31, and then, the distance in the set movement zone is calculated as the null-point zone. Here, the movement zone set in the subjacent object determination has the same meaning as the null-point zone. As the movement zone set in the subjacent object determination, the following four patterns are used.

Pattern 1 is a pattern when a null point is first detected after an obstacle is detected. Thus, a movement zone of the pattern 1 is a zone from a detection point to a null point detected after the detection point, which includes one or more convex points. In this case, the detection point is considered as the null point.

Pattern 2 is a pattern when an extrapolation point is detected after an obstacle is detected and before a null point is detected. Thus, a movement zone of the pattern 2 is a zone from a detection point to an extrapolation point detected after the detection point, which includes one or more convex points. In this case, the detection point and the extrapolation point are considered as the null points.

Pattern 3 is a normal pattern when, after a null point is detected, the next null point is detected without detection of an extrapolation point. Thus, a movement zone of the pattern 3 is a zone from a null point to a null point detected after the former null point, which includes one or more convex points.

Pattern 4 is a pattern when an extrapolation point is detected after a null point is detected and before the next point is detected. Thus, a movement zone of the pattern 4 is a zone from a null point to an extrapolation point detected after the null point, which includes one or more convex points. In this case, the extrapolation point is considered as the null point.

Figure 7:
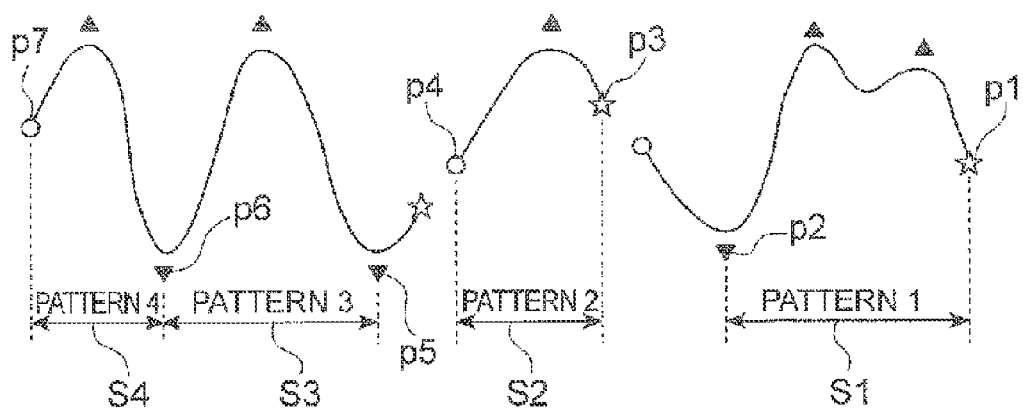
FIG. 7 is a diagram illustrating respective patterns in movement zones.

Here, the respective patterns of the movement zones will be described in detail with reference to FIG. 7. FIG. 7 is a diagram illustrating the respective patterns of the movement zones. In FIG. 7, an asterisk mark represents a detection point, a white circle represents an extrapolation point, an upward-convex triangle mark represents a convex point, and a downward-convex triangle mark represents a null point.

As in S1 shown in FIG. 7, after a detection point p1 is detected, when a null point p2 is detected through one or more convex points, a zone between the detection point p1 and the null point p2 becomes the movement zone of the pattern 1.

As in S2 shown in FIG. 7, after a detection point p3 is detected, when an extrapolation point p4 is detected through one or more convex points and before a null point is detected, a zone between the detection point p3 and the extrapolation point p4 becomes the movement zone of the pattern 2.

As in S3 shown in FIG. 7, after a null point p5 is detected, when the next null point p6 is detected through one or more convex point, a zone between the null point p5 and the null point p6 becomes the movement zone of the pattern 3.

As in S4 shown in FIG. 7, after the null point p6 is detected and before a null point is detected, when an extrapolation point p7 is detected through one or more convex points, a zone between the null point p6 and the extrapolation point p7 becomes the movement zone of the pattern 4.

Then, in the subjacent object determination, the movement zone (null-point zone) nearest to the host vehicle in a predetermined range is set as a reference zone. The predetermined range may be arbitrarily set. For example, a range where an obstacle can be stably detected from the output waveform of the radar 2, a range of a predetermined distance from the obstacle, or the like may be set as the predetermined range.

Then, in the subjacent object determination, it is determined whether the detected obstacle is the collision target on the flat road or the subjacent object on the front side of the descending slope according to whether the movement zone (null-point zone) of the distance between the null points shorter than the distance between the null points in the reference zone is detected in a distant zone that is away from the reference zone. That is, if the movement zone (null-point zone) of the distance between the null points shorter than the distance between the null points in the reference zone is not detected in the distant zone that is away from the reference zone, it is determined that the detected obstacle is the collision target on the flat road. On the other hand, if the movement zone (null-point zone) of the distance between the null points shorter than the distance between the null points in the reference zone is detected in the distant zone that is away from the reference zone, it is determined that the detected obstacle is the subjacent object on the front side of the descending slope.

Further, if it is determined that the detected obstacle is the collision target on the flat road in the subjacent object determination, the determination section 33 sets a subjacent object flag to OFF. On the other hand, if it is determined that the detected obstacle is the subjacent object on the front side of the descending slope, the determination section 33 sets the subjacent object flag to ON.

Figure 8:
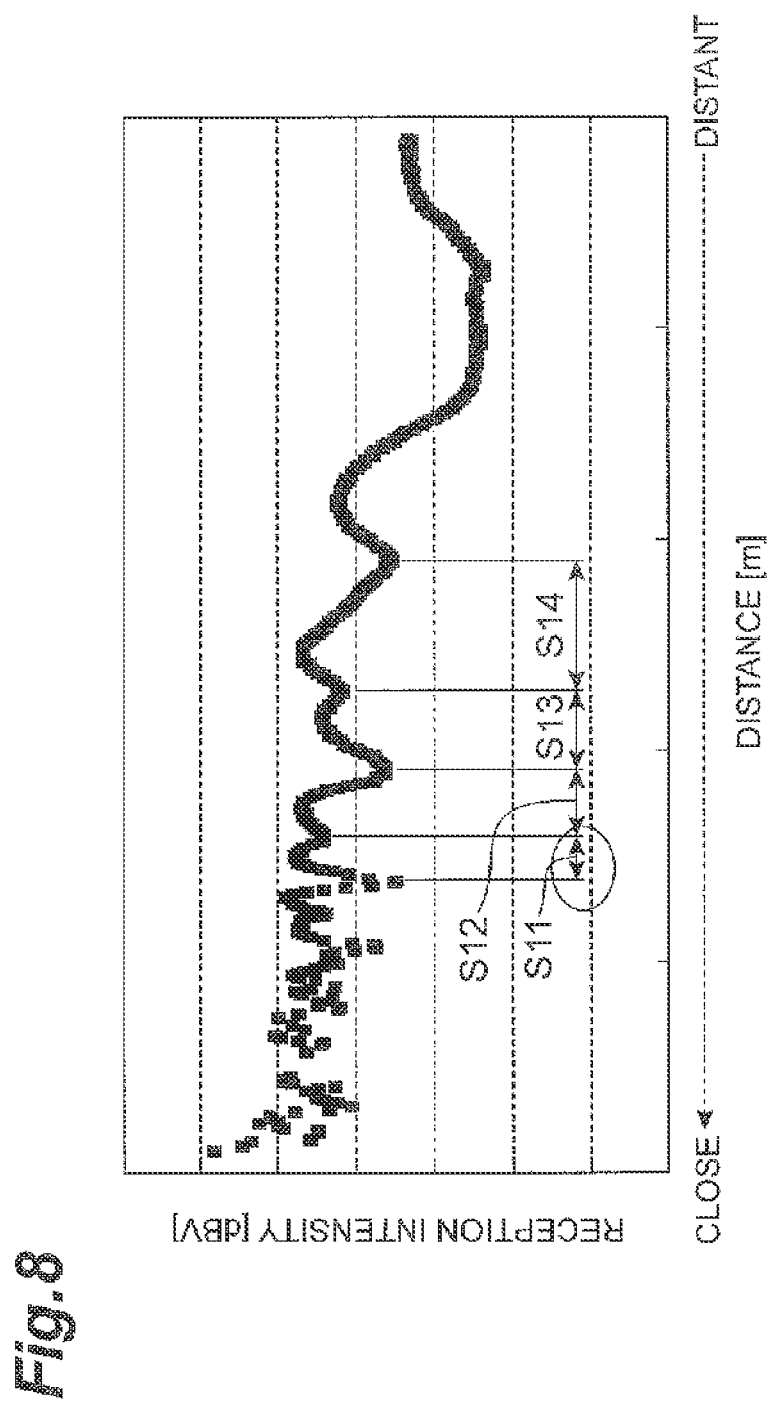
FIG. 8 is a diagram illustrating an output waveform of a radar when an obstacle is a collision target on a flat road.
Figure 9:
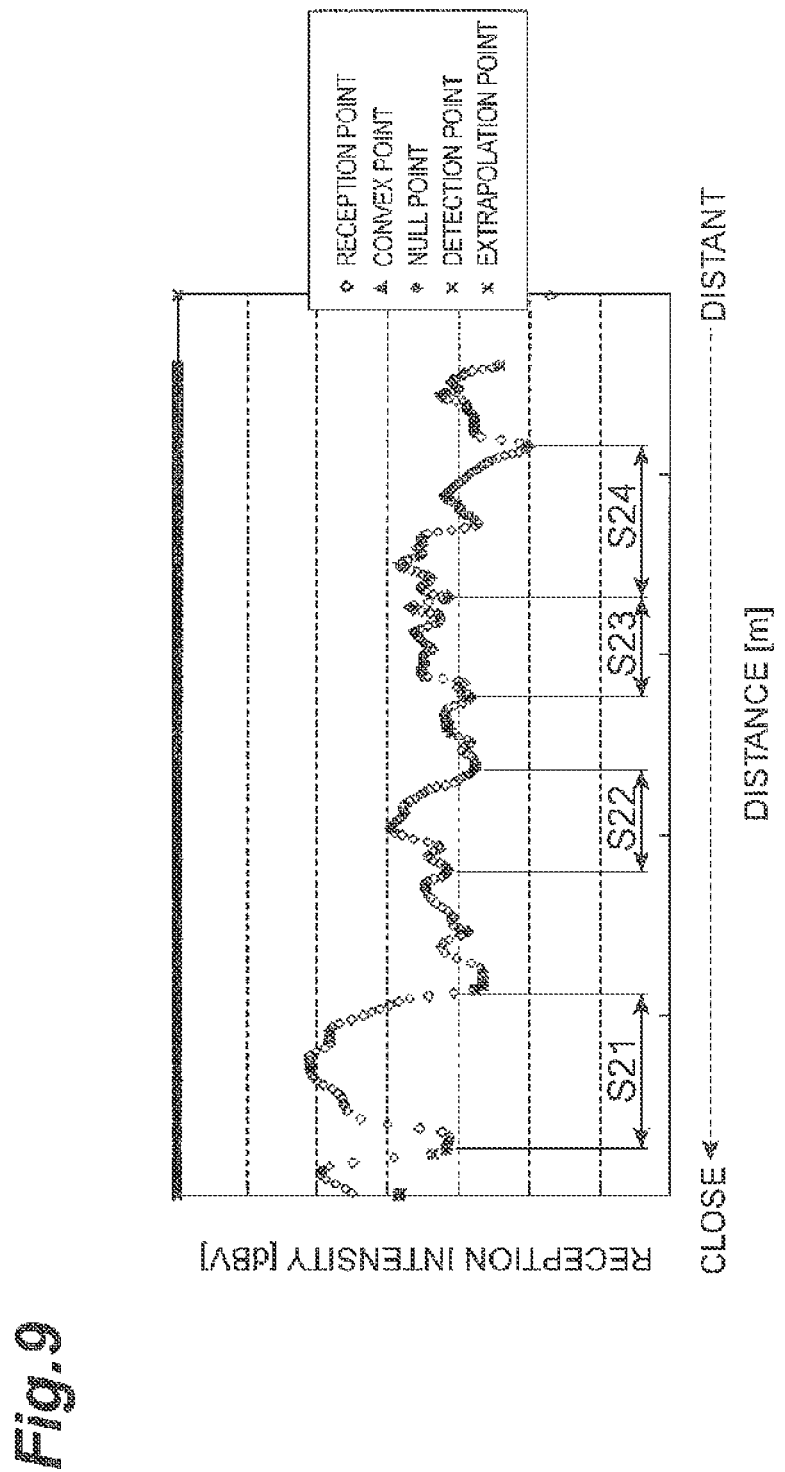
FIG. 9 is a diagram illustrating an output waveform of a radar when an obstacle is a subjacent object on a front side of a descending slope.

Here, the subjacent object determination will be further described with reference to FIGS. 8 and 9. FIG. 8 is a diagram illustrating an output wave of a radar when an obstacle is a collision target on a flat road. FIG. 9 is a diagram illustrating an output waveform of a radar when an obstacle is a subjacent object on a front side of a descending slope. In FIG. 9, detection points, convex points, null points and extrapolation points are shown. Further, in FIG. 9, points that are ignored without being detected as interpolation points by the waveform analysis section 32 are displayed in an upper part of the figure.

First, a case where the output signal of the radar 2 obtained by the radar output signal obtaining section 31 has an output waveform shown in FIG. 8 is considered. In this case, four movement zones S11 to S14 are set, and a movement zone S11 nearest to the host vehicle among the four movement zones S11 to S14 is set as a reference zone. When comparing distances between null points in the movement zones S11 to S14, the distances between the null points in the movement zones S11 to S14 are shortened as the host vehicle approaches the obstacle. Further, the distances between the null points in all the movement zones S12 to S14 placed in distant zones that are away from the movement zone S11 that is the reference zone are longer than the distance between the null points in the movement zone S11 that is the reference zone. Thus, it is determined that the detected obstacle is the collision target on the flat road.

Then, a case where the output signal of the radar 2 obtained by the radar output signal obtaining section 31 has an output waveform shown in FIG. 9 is considered. In this case, four movement zones S21 to S24 are set, and the movement zone S21 nearest to the host vehicle among the four movement zones S21 to S24 is set as a reference zone. When distances between null points in the movement zones S21 to S24 are compared with each other, the distances between the null points in the movement zones S21 to S24 are long or short regardless of the distance to the obstacle. Further, while the distance between the null points in the movement zone S24 is longer than the distance between the null points in the movement zone S21 that is the reference zone, the distances between the null points in the movement zones S22 and S23 are shorter than the distance between the null points in the movement zone S21 that is the reference zone. Thus, it is determined that the detected obstacle is the subjacent object on the front side of the descending slope.

If the determination section 33 determines that the obstacle detected by the radar 2 is the obstacle with the likelihood of collision with the host vehicle, the driving assistance section 34 controls the meter 4, the buzzer 5, the brake actuator 6 and the like to perform driving assistance for the vehicle. The driving assistance section 34 may perform known various driving assistances for avoiding collision with the obstacle, in addition to the control of the meter 4, the buzzer 5, the brake actuator 6 and the like.

Figure 12:
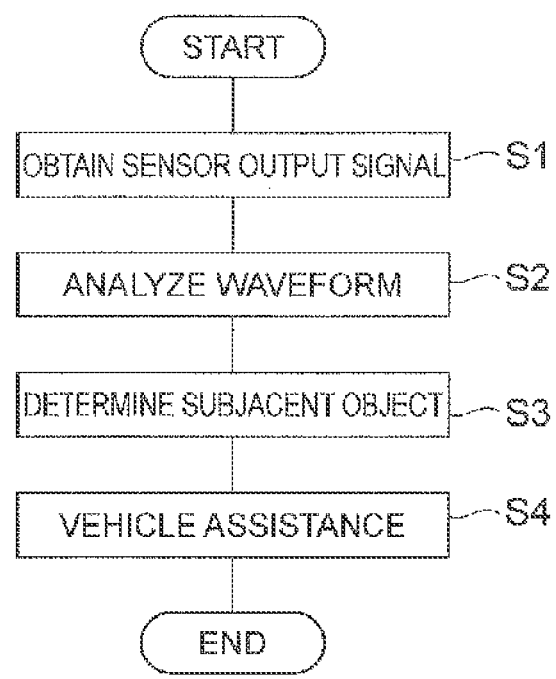
FIG. 12 is a flowchart illustrating a processing operation of a driving assistance ECU according to a first embodiment.

Next, a processing operation of the obstacle determination device 1 according to the present embodiment will be described with reference to FIG. 12. FIG. 12 is a flowchart illustrating a processing operation of a driving assistance ECU according to a first embodiment.

As shown in FIG. 12, first, the driving assistance ECU 3 obtains the output signal of the radar 2 by the radar output signal obtaining section 31 (step S1).

Then, the driving assistance ECU 3 analyzes the output waveform of the radar 2 by the waveform analysis section 32 (step S2). The output waveform of the radar 2 is an output waveform represented by the output signal of the radar 2 obtained in step S1. In step S2, detection points, convex points, null points and extrapolation points are detected from the output waveform of the radar 2. As described above, by detecting the detection points from the output waveform of the radar 2, it is possible to detect the obstacle in front of the vehicle.

Then, the driving assistance ECU 3 performs the subjacent object determination by the determination section 33 (step S3). In the subjacent object determination in step S3, first, a movement zone that is a target of a null-point zone is set from the detection points, the convex points, the null points and the extrapolation points detected in step S2. Then, in the subjacent object determination in step S3, it is determined whether a movement zone (null-point zone) of the distance between null points shorter than the distance between null points in a reference zone is present in a distant zone that is away from the reference zone. Further, if the movement zone (null-point zone) of the distance between the null points shorter than the distance between the null points in the reference zone is not detected in the distant zone that is away from the reference zone, it is determined that the detected obstacle is the collision target on the flat road, and then, the subjacent object flag is set to OFF. On the other hand, if the movement zone (null-point zone) of the distance between the null points shorter than the distance between the null points in the reference zone is detected in the distant zone that is away from the reference zone, it is determined that the detected obstacle is the subjacent object on the front side of the descending slope, and then, the subjacent object flag is set to ON.

Then, the driving assistance ECU 3 performs the driving assistance for the vehicle based on the determination result in step S3 by the driving assistance section 34 (step S4). That is, in step S4, if the setting of the subjacent object flag is ON (if it is determined that the detected obstacle is the subjacent object on the front side of the descending slope), the driving assistance ECU 3 does not perform the driving assistance for the vehicle. On the other hand, if the setting of the subjacent object flag is OFF (in step S3, if it is determined that the detected obstacle is the collision target on the flat road), the driving assistance ECU 3 controls the meter 4, the buzzer 5, the brake actuator 6 and the like to perform the driving assistance for the vehicle so as to avoid collision with the obstacle.

As described above, according to the obstacle determination device 1 according to the present embodiment, by performing the collision determination based on a relationship between the distance between the null points in the reference zone and the distance between the null points in the null-point zone in the distant zone that is away from the reference zone, it is possible to prevent the subjacent object on the front side of the descending slope from being mistakenly determined as an obstacle with a likelihood of collision with the host vehicle. Further, since it is possible to perform the collision determination on the slope with high accuracy only using the output of the radar 2 by performing the collision determination of the obstacle in this manner, it is possible to suppress a load increase in control of the collision determination.

Further, by setting the zone including the convex point where the output of the radar is high as the movement zone (null-point zone), it is possible to appropriately set the null-point zone.

Second Embodiment

Next, an obstacle determination device 1 according to a second embodiment will be described in detail. The obstacle determination device 1 according to the second embodiment is basically the same as the obstacle determination device 1 according to the first embodiment, but is different from the obstacle determination device 1 according to the first embodiment only in the function and processing operation of the determination section 33. Thus, hereinafter, only parts different from the obstacle determination device 1 according to the first embodiment will be described, and the description of the same parts as in the obstacle determination device 1 according to the first embodiment will not be repeated.

The determination section 33 of the driving assistance ECU 3 has a function for performing arbitration determination based on a reception intensity, in addition to subjacent object determination for determining a subjacent object during traveling on a slope.

The arbitration determination is performed to determine whether a detected obstacle is a collision target based on whether the reception intensity of the radar 2 exceeds a predetermined threshold value irrespective of the result of the subjacent object determination. That is, if the reception intensity of the radar 2 exceeds the predetermined threshold value, it is determined that the detected obstacle is the collision target. On the other hand, if the reception intensity of the radar 2 does not exceed the predetermined threshold value, it is determined that the detected obstacle is not the collision target.

The threshold value is a value between the reception intensity of the reflected wave when the radar 2 detects the collision target and the reception intensity of the reflected wave when the radar 2 detects the subjacent object on the front side of the descending slope. Here, it is preferable to set an appropriate range of the threshold value by measuring the reception intensities in advance.

However, the reception intensity of the radar 2 becomes high as the host vehicle approaches the obstacle. Thus, it is preferable that the threshold value become high as the host vehicle approaches the obstacle. In this case, it is more preferable that the threshold value become linearly high as the host vehicle approaches the obstacle in view of setting the threshold value easily.

Figure 10:
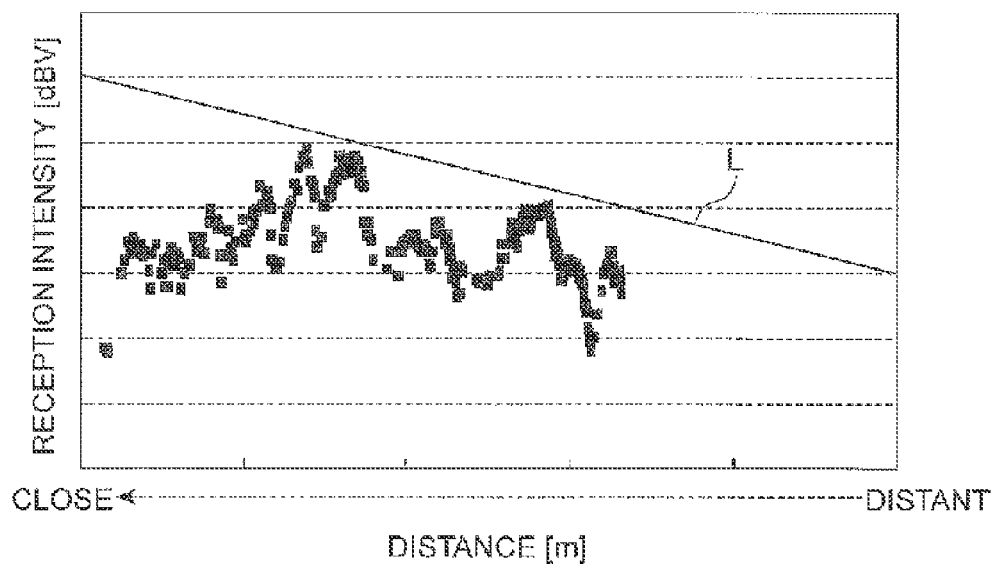
FIG. 10 is a diagram illustrating an example of a relationship between an output waveform of a radar and a predetermined threshold value.
Figure 11:
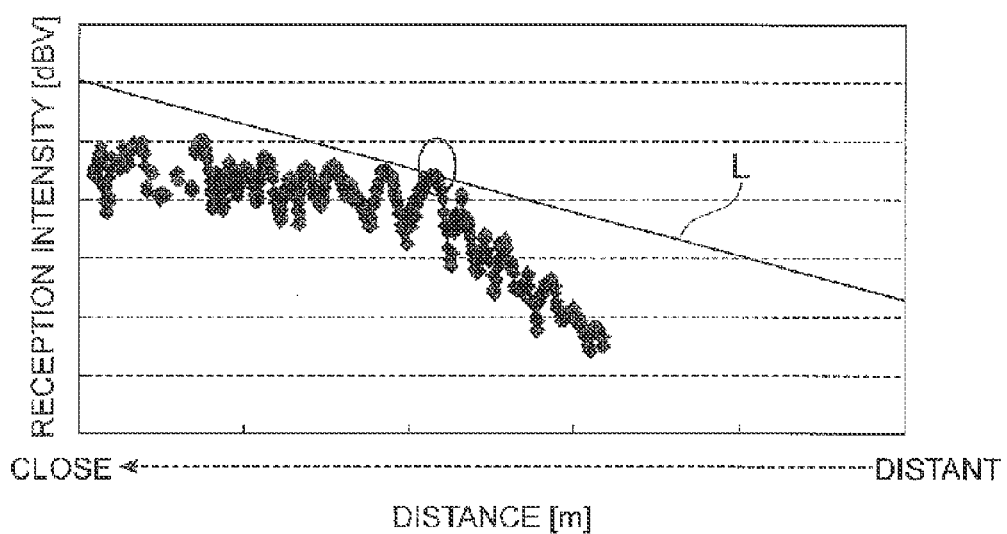
FIG. 11 is a diagram illustrating an example of a relationship between an output waveform of a radar and a predetermined threshold value.

FIGS. 10 and 11 are diagrams illustrating an example of a relationship between an output waveform of a radar and a predetermined threshold value. In FIGS. 10 and 11, a threshold value L is a value between the reception intensity when the radar 2 detects the collision target on the flat road and the reception intensity when the radar 2 detects the subjacent object on the front side of the descending slope, which shows a straight line that becomes high as the host vehicle approaches the obstacle. As shown in FIG. 10, if the reception intensity of the radar 2 does not exceed the threshold value L, it is determined that the detected obstacle is not the collision target on the flat road and the descending slope. On the other hand, as shown in FIG. 11, if the reception intensity of the radar 2 exceeds the threshold value L even at one place, it is determined that the detected obstacle is the collision target on the flat road and the descending slope.

Further, if it is determined in the arbitration determination that the detected obstacle is not the collision target on the flat road and the descending slope, the determination section 33 does not perform any operation according to the result of the above-described subjacent object determination. On the other hand, if it is determined in the arbitration determination that the detected obstacle is the collision target on the flat road and the descending slope, the determination section 33 sets the subjacent object flag to OFF.

Figure 13:
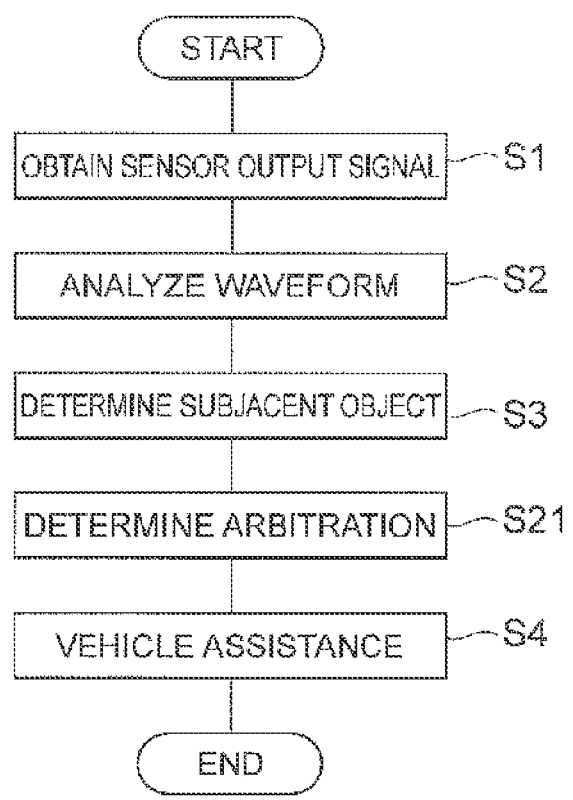
FIG. 13 is a flowchart illustrating a processing operation of a driving assistance ECU according to a second embodiment.

Next, a processing operation of the obstacle determination device 1 according to the second embodiment will be described with reference to FIG. 13. FIG. 13 is a flowchart illustrating a processing operation of a driving assistance ECU in the second embodiment.

As shown in FIG. 13, similar to the first embodiment, the driving assistance ECU 3 first obtains an output signal of the radar 2 by the radar output signal obtaining section 31 (step S1), analyzes an output waveform of the radar 2 by the waveform analysis section 32 (step S2), and performs subjacent object determination by the determination section 33 (step S3).

Then, the driving assistance ECU 3 performs arbitration determination by the determination section 33 (step S21). In the arbitration determination of step S21, it is determined whether the reception intensity of the radar 2 obtained in step S1 exceeds a predetermined threshold value. Further, if the reception intensity of the radar 2 does not exceed the predetermined threshold value, the driving assistance ECU 3 does not perform any operation, and maintains the subjacent object flag set in step S3. On the other hand, if the reception intensity of the radar 2 exceeds the predetermined threshold value, the driving assistance ECU 3 determines that the detected obstacle is the collision target, and sets the subjacent object flag to OFF.

Then, the driving assistance ECU 3 performs driving assistance for the vehicle based on the determination results in steps S3 and S21 by the driving assistance section 34 (step S4). That is, in step S4, if the setting of the subjacent object flag is ON, the driving assistance ECU 3 does not perform the driving assistance for the vehicle, and if the setting of the subjacent object flag is OFF, the driving assistance ECU 3 controls the meter 4, the buzzer 5, the brake actuator 6 and the like to perform the driving assistance for the vehicle so as to avoid collision with the obstacle.

As described above, according to the obstacle determination device 1 according to the present embodiment, the following effects are obtained in addition to the effects of the obstacle determination device 1 according to the first embodiment. That is, irrespective of the subjacent object determination, if the reception intensity of the radar 2 exceeds the threshold value, it is determined that the host vehicle may collide with the detected obstacle. Thus, it is possible to improve the accuracy of the collision determination even when the influence of the multipath is changed due to a surrounding environment.

Hereinbefore, the preferred embodiments of the invention have been described, but the invention is not limited to the above-described embodiments.

For example, the subjacent object determination in the above embodiments may be performed as follows, in order to prevent the influence of noise or the like. That is, if the number of the movement zones (null-point zones) of the distance between the null points is shorter than the distance between the null points in the reference zone in the distant zone that is away from the reference zone is less than a predetermined number, it is detected that the detected obstacle is the collision target on the flat road. On the other hand, if the number of the movement zones (null-point zones) of the distance between the null points shorter than the distance between the null points in the reference zone in the distant zone that is away from the reference zone is equal to or greater than the predetermined number, it is determined that the detected obstacle is the subjacent object on the front side of the descending slope. In this case, the predetermined number that is a determination reference is an integer of 1 or greater. Here, if the predetermined number is set to 1, the subjacent object determination described in the embodiments is obtained.

INDUSTRIAL APPLICABILITY

The invention may be used as an obstacle determination device that determines collision with an obstacle detected by output of a radar mounted on a vehicle.

REFERENCE SIGNS LIST

1: Obstacle determination device
2: Radar
3: Driving assistance ECU
4: Meter
5: Buzzer
6: Brake actuator

31: Radar output signal obtaining section
32: Waveform analysis section
33: Determination section
34: Driving assistance section
A: Host vehicle
B1: Subjacent object on flat road
B2: Collision target on flat road
B3: Subjacent object on front side of descending slope

The invention claimed is:

1. An obstacle determination device that determines collision with an obstacle detected by output of a radar mounted on a vehicle,
   wherein when a distance of a null-point zone divided by null points where the output of the radar is low is represented as a distance between the null points,
   in a distant zone that is away from a reference zone that is the null-point zone nearest to a host vehicle in a predetermined range, if the null-point zone of the distance between the null points shorter than the distance between the null points in the reference zone is detected by a predetermined number or more, it is determined that the host vehicle does not collide with the obstacle.

2. The obstacle determination device according to claim 1, wherein the null point is a point where the output of the radar is low due to multipath.

3. The obstacle determination device according to claim 1, wherein the null-point zone is a zone that includes a convex point where the output of the radar is high.

4. The obstacle determination device according to claim 3, wherein the convex point is a point where the output of the radar is high due to multipath.

5. The obstacle determination device according to claim 1, wherein the predetermined range is a range where the radar is capable of stably detecting the obstacle.

6. The obstacle determination device according to claim 1, wherein even though the null-point zone of the distance between the null points shorter than the distance between the null points in the reference zone is detected by the predetermined number or more, if the output of the radar exceeds a threshold value, it is determined that the host vehicle collides with the obstacle.

7. The obstacle determination device according to claim 6, wherein the threshold value becomes high as the host vehicle approaches the obstacle.

* * * * *